UNITED STATES PATENT OFFICE.

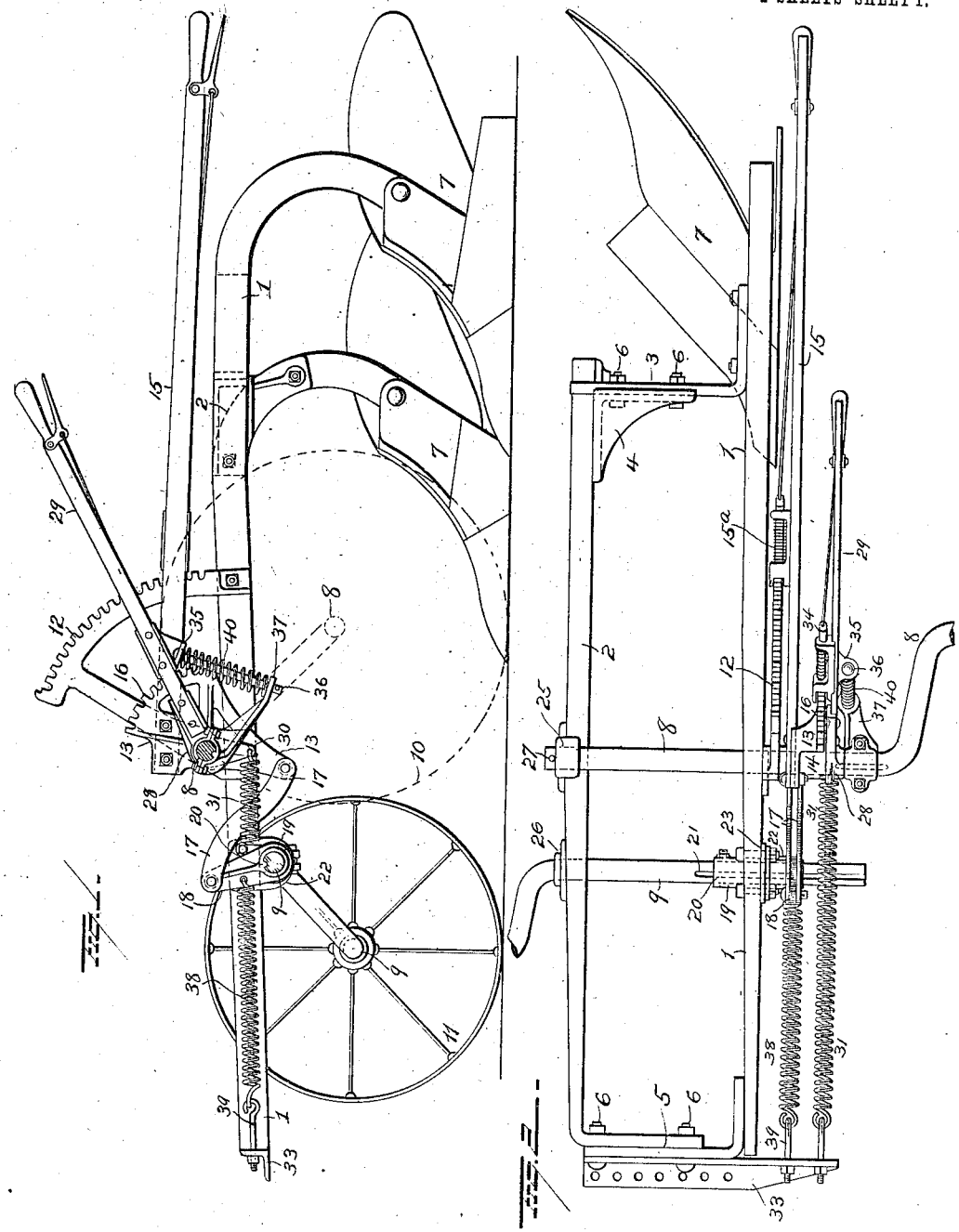

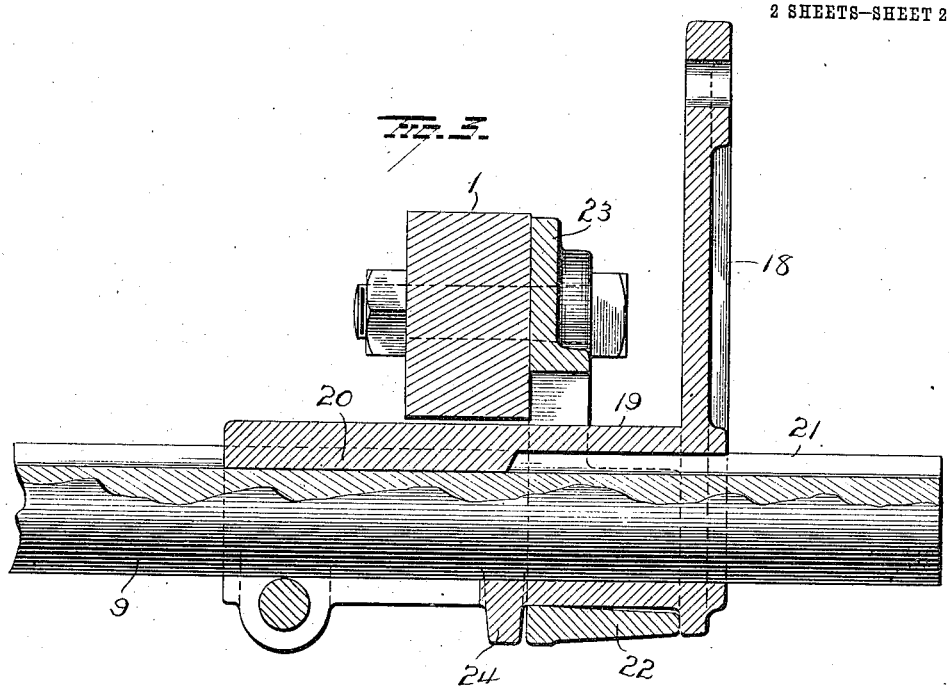
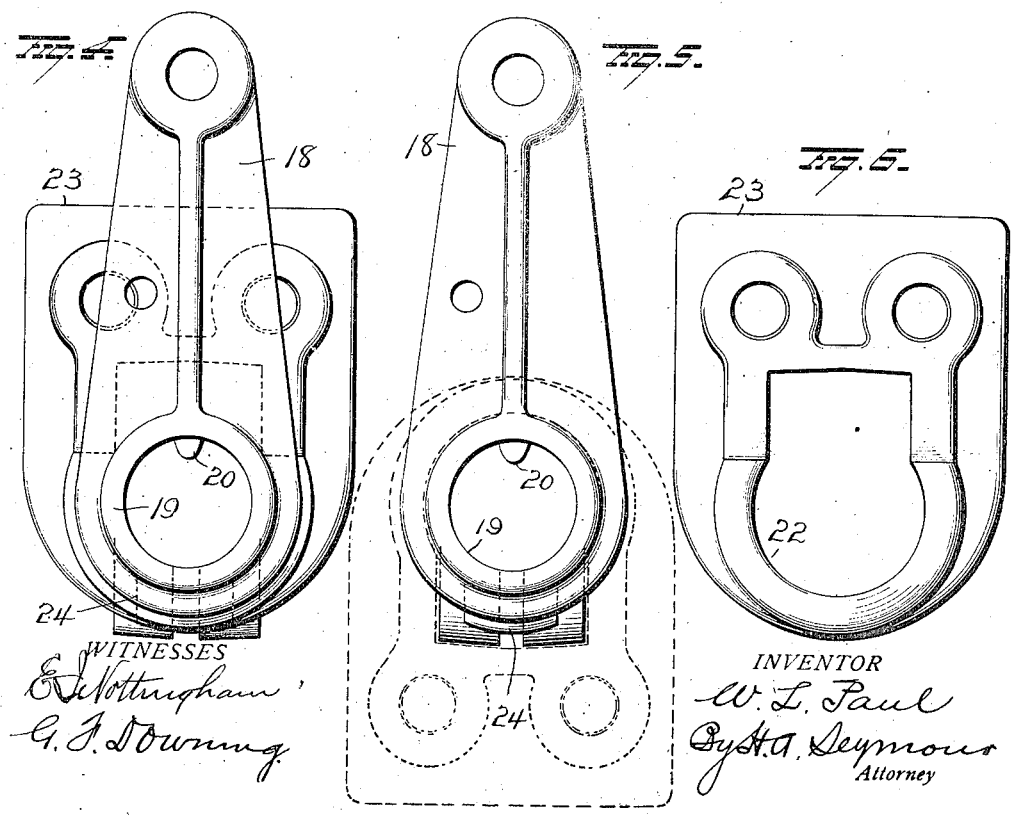

WILLIAM L. PAUL, OF SOUTH BEND, INDIANA, ASSIGNOR TO OLIVER CHILLED PLOW WORKS, OF SOUTH BEND, INDIANA.

GANG-PLOW.

974,592. Specification of Letters Patent. Patented Nov. 1, 1910.

Application filed April 23, 1908. Serial No. 428,744.

*To all whom it may concern:*

Be it known that I, WILLIAM L. PAUL, of South Bend, in the county of St. Joseph and State of Indiana, have invented certain new and useful Improvements in Gang-Plows; and I do hereby declare the following to be a full, clear, and exact description of the invention, such as will enable others skilled in the art to which it appertains to make and use the same.

My invention relates to an improvement in gang plows,—the object being to provide improved means for assisting the operator in lifting the plows.

A further object is to provide a strong compact structure constructed to permit of adjustments as to width.

With these ends in view my invention consists in the parts and combinations of parts as will be more fully explained and pointed out in the claims.

In the accompanying drawings, Figure 1 is a view in side elevation of my improved plow. Fig. 2 is a view in plan of same, the wheels being omitted. Fig. 3 is a view in side elevation of the adjustable bearing for the front axle and Fig. 4 is an end view of the latter. Figs. 5 and 6 are detail views of the adjustable bearing.

1 and 2 represent the plow beams, arranged parallel as shown, and connected at their rear ends by the braces 3 and 4, and at their front ends by the brace 5, the front end of beam 2 being bent at right angles so as to be overlapped by brace 5. The braces 3 and 5 are provided with a series of holes for the passage of the bolts 6, thus permitting of changes in adjustment of the width of the frame formed by the two beams and their connecting braces. Each beam carries a plow 7, and the frame and its plows are supported on the two crank axles 8 and 9, on the former of which is journaled the land wheel 10, shown in dotted lines in Fig. 2, and on the latter is journaled the furrow wheel 11.

Secured to the beam 1, is the toothed segment 12, provided just above the beam, with a bearing for the passage of the rear axle 8, and loosely mounted on the axle 8, adjacent to the outer side of the toothed segment 12, is the lever arm 13, having an elongated hub or bearing 14 and provided with a recessed seat for the attachment of the longer lever 15, the latter carrying a spring actuated dog 15ᵃ for engagement with the teeth of segment 12, which, as before explained, is secured to beam 1. Lever arm 13 is also provided with a toothed segment 16, the function of which will be hereinafter explained. Lever arm 13 depends below axle 8, and is connected at its lower end to the links 17, which latter are connected at their front ends to the upper end of arm 18 on sleeve 19. This sleeve 19 is split and clamped to axle 9, and is provided with an internal key or spline 20 which rests in the groove 21 in axle 9. By loosening up on the tightening bolts of this split sleeve, and removing the screws connecting the beam at the ends, the frame may be made wider or narrower as the case may be, and by simply loosening up the sleeve, the axle 9 may be adjusted to carry the furrow wheel 11 nearer to or farther away from the beam 2. Sleeve 19 is mounted in the bearing 22, having upwardly projecting flange 23 by which it is secured to the beam 1, and projects horizontally at both sides of beam 1 as shown in Fig. 2, and is prevented from moving longitudinally in its bearing 22, by the flanges 24 integral with the sleeve and bearing against the ends of bearing 22, as shown in Fig. 3. Axle 8 is supported on the furrow side of bearing 25 secured to beam 2, and axle 9 is supported on the same side by bearing 26 also secured to beam 2, axle 8, being held against longitudinal movement in one direction in its bearings, by the pin 27 passing through the end of axle as shown in Fig. 2.

Loosely mounted on axle 8, adjacent to the outer side of lever arm 13, is the lever arm 28, provided with a recessed seat for the end of the shorter lever 29, and with a depending arm 30 to which the rear end of coiled spring 31 is secured, the front end of said spring being secured to a bolt adjustably secured to the clevis plate 33. Lever 29 carries a spring pressed dog 34 for engaging the teeth of segment 16, and is provided on its underside with a shoulder 35, through which the bolt 36 passes. This bolt extends forwardly and downwardly and passes through a hole in the arm 37, the hub of which has a key and groove connection with axle 8 and through spring 40 seated on arm 37 and bearing at its upper end against shoulder 35. The arm 37 may be adjusted on the axle, but when clamped in place is held against any movement independent of the axle, and coöperates with the pin 27 in holding axle 8 against longitudinal movement. Upwardly projecting arm 18 on sleeve 19, is also connected to clevis plate 33 by a spring 38 and adjustable bolt 39.

From the foregoing it will be seen that if the longer lever 15 be released from the segment 12, and elevated, it, acting through lever arm 13 to which it is secured, through segment 16, spring dog 34, lever 29, lever arm 28, spring 40 and arm 37, turns crank-axle 8 in a direction to lower the frame, the interposition of the spring 40 between the lever 29 and the arm 37 on the axle 8, rendering the connection a yielding, instead of a rigid one, and also forming a yielding support for the frame on the land side wheel axle. As lever arm 13 is also connected by the link 17 with the upwardly projecting arm 18 of sleeve 19 on the front axle 9, the upward movement of lever 15 will also turn crank axle 9 in a direction to lower the frame. By disconnecting lever 29 from segment 16, and moving it up or down, the rear axle 8 will be turned to adjust its wheel 10 for the land or furrow as the case may be. The springs 31 and 38 are so connected to the parts as to materially assist the operator in elevating the plows.

With this construction, by simply disconnecting the beams at the ends, and loosening up the sleeve 19 and arm 37 on their respective axles, the frame can be made wider or narrower as desired without removing any of the parts, and by simply loosening up sleeve 19 on its axle the latter can be adjusted lengthwise.

It is evident that changes in the construction and relative arrangement of the several parts might be made without avoiding my invention and hence I would have it understood that I do not restrict myself to the particular construction and arrangement of parts shown and described, but,—

Having fully described my invention what I claim as new and desire to secure by Letters-Patent, is:—

1. In a gang plow the combination with two crank axles and a wheel on each, of a lever loose on the rear axle and an arm projecting upwardly from the front axle, a link connecting the loose lever on the rear axle at a point below the latter with the upwardly projecting arm on the front axle and yielding means connecting said lever with the rear axle whereby the latter is also turned by said lever.

2. In a gang plow the combination with two crank axles and a wheel on each, of a lever loose on the rear axle, an arm projecting upwardly from the front axle, a link connecting the loose lever at a point below the rear axle with the upwardly projecting arm on the front axle, means for yieldingly connecting said lever and rear axles whereby both axles may be turned in unison, and a second lever for turning the rear axle independently of the front axle.

3. In a gang plow, the combination with a frame, front and rear crank axles, and a wheel on each axle, of a toothed segment secured to the frame, a lever arm loose on the rear axle and adapted to be locked to the segment on the frame, the said lever arm having a toothed segment, means connecting said lever arm at a point below the axle with an upwardly projecting arm on the front axle, a second lever arm also loose on the rear axle and having means for detachably locking it to the segment on the first mentioned lever arm, an arm secured to the rear axle and a spring interposed between said arm and second lever arm.

4. The combination with a frame, two crank axles, and a wheel on each axle, of a lever arm loose on the rear axle and adapted to be locked to the frame, a sleeve adjustably secured to the front axle and provided with an upwardly projecting arm, a link connecting said arm above its axle to the loose lever arm below the rear axle, means for locking said loose lever arm to the frame, and second lever loosely mounted on the rear axle and having means for its detachable connection to the loose lever arm, yielding means between said second lever and rear axle and springs connecting the frame and axle turning means for assisting in elevating the plows.

In testimony whereof, I have signed this specification in the presence of two subscribing witnesses.

WILLIAM L. PAUL.

Witnesses:
CLYDE C. McDONALD,
THOS. A. FREEMAN.